April 13, 1926.

Re. 16,322

H. HUEBER

POWER OPERATED WINDSHIELD CLEANER

Original Filed August 16, 1920

INVENTOR

Henry Hueber by Barton A. Bean, Jr.

ATTORNEY

Reissued Apr. 13, 1926. Re. 16,322

UNITED STATES PATENT OFFICE.

HENRY HUEBER, OF SEATTLE, WASHINGTON, ASSIGNOR, BY MESNE ASSIGNMENTS, TO TRICO PRODUCTS CORPORATION, OF BUFFALO, NEW YORK.

POWER-OPERATED WINDSHIELD CLEANER.

Original No. 1,437,521, dated December 5, 1922, Serial No. 403,790, filed August 16, 1920. Application for reissue filed September 4, 1923. Serial No. 660,958.

*To all whom it may concern:*

Be it known that I, HENRY HUEBER, a citizen of the United States, residing at Seattle, in the county of King and State of Washington, have invented new and useful Improvements in Power-Operated Windshield Cleaners, of which the following is a specification, reference being had to the accompanying drawings, forming a part thereof.

This invention relates to window cleaning devices and more particularly to that type of devices which are adapted to be operated by power actuated means to remove dirt, snow or moisture from the outside of a window or windshield of a car, automobile, and the like.

The object of my invention is the provision of a simple, inexpensively constructed and efficient window cleaning device of this character which is automatic in action.

With these ends in view the invention consists in the novel construction, arrangement and combination or parts as will be hereinafter described and claimed.

In the accompanying drawings, Figure 1 is a rear elevational view of a portion of an automobile windshield showing an embodiment of my invention applied thereto.

Figure 1:
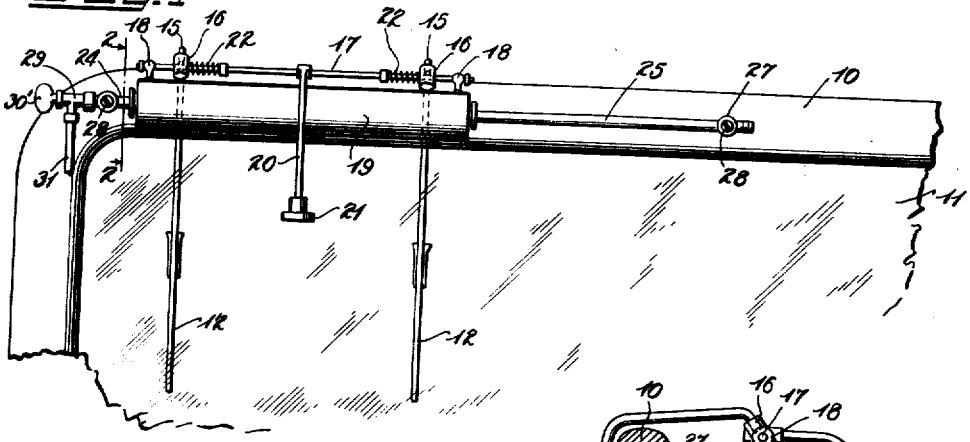

In said drawings, the reference numeral 10 represents the frame and 11 the glass of a windshield, which may be of any suitable construction.

Figure 2:
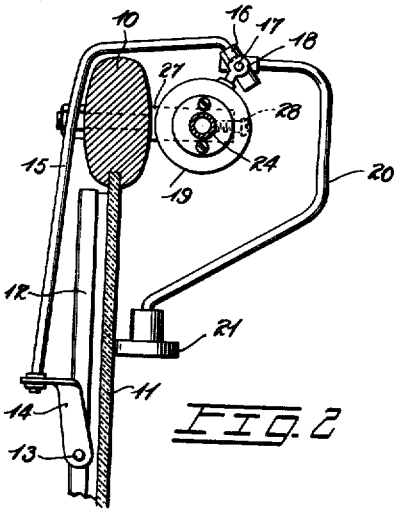
Figure 2 is a sectional view through line 2—2 of Figure 1.

The cleaner comprises one or more squeegee elements 12, two being shown, which are each connected by a pivotal pin, as 13 in Figure 2, to an attachment 14 secured to an arm 15 which, in the illustrated embodiment of the invention, extends over the windshield frame 10 into a socket piece 16.

The socket pieces 16 are mounted for oscillatory movements upon a transversely arranged horizontal rod 17 which is rotatable in apertured post elements or bearings 18 secured to the ends of a cylinder 19.

Another arm 20 rigidly secured to the rod 17 extends, as shown, downwardly from the latter and carries upon its lower end a wheel 21 which tracks against the inner surface of the windshield glass 11. Coil springs 22 about said rod engage over the arms 15 and cooperate with the resiliency of the arms to cause the squeegees to press against the front surface of the glass. The pneumatic bottom of the device includes a casing member or cylinder and a piston, constituting a motor couple one of which members is movable relatively to the other by means of the application of a difference in fluid pressures, together with means for automatically reversing the direction of travel of the movable member. In the embodiment shown, the device is adapted to operate on low, vacuum-induced atmospheric air pressures as obtained by operatively connecting the motor of the windshield cleaner with a suction passage of an automotive vehicle engine and the cylinder 19 constitutes the movable member of a pneumatic motor and is mounted for axial reciprocating motion upon a non-movable member.

Said non-movable member comprises a piston 23 fitted within the cylinder bore and rigidly secured to axially aligned tubular piston or guide rods 24 and 25, hereinafter respectively designated as "exhaust" and "pressure" pipes, which extend through stuffing boxes provided in the cylinder heads 26 and 26¹ and are secured, as by set screws 27, to brackets 28 rigidly connected to the frame 10.

Figure 3:
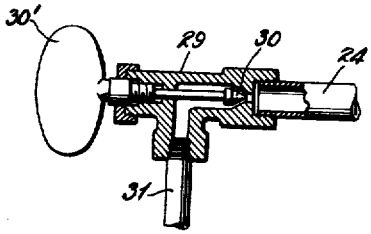
Figure 3 is a longitudinal view of the valve for regulating the supply of the power medium to the operating motor.

The outer ends of said pipes are screw threaded whereby either of them may be engaged selectively in the body or casing 29 of a needle valve 30 (Figure 3) which is manually controlled by a handle end 30¹ to regulate the supply or delivery of the power medium to or from the cylinder ends with respect to a tube 31 as will be presently explained.

The piston 23 above referred to is desirably provided with rings or, as shown, with cap leather packing 32 to make a non-leakable fit in the bore of cylinder 19.

Said piston is provided with a longitudinally disposed cylindrical chamber 33 communicating by a duct 34 with the pressure pipe 25 and through ports 35 and 36 with the spaces in the opposite ends of the cylinder.

At the ends of the chamber 33 are provided seats for a duplex valve, having two spaced heads 38 and 39, or valves proper, which are integrally connected by a bar element of less diameter than the heads. Said valve heads, moreover, are of equal diameter so that the pressure of a fluid admitted from pressure pipe 25 into chamber 33 between the heads will not disturb the valve.

From each end of said valve is a stem 41 which extends through the adjacent port and is equipped at its outer end with a buffer spring 42 which is adapted to be encountered by the heads 26 or 26¹ of the cylinder in the reciprocatory movements of the same, resulting in the duplex valve being shifted from one of the seats therefor to the other. Also provided in a piston 23 is a longitudinal passage 43 communicating by a duct 44 with the exhaust pipe 24 and with recesses 45 in opposite ends of the piston. Valve seats 46 and 47 (Figure 5) are provided at the ends of passage 43 for valves 48 and 49 located in the recesses and adapted to close against the respective seats. The valve 48 has a stem indicated in Figure 4 by 48¹ which slidably extends into a socket provided in a stem 49¹ of the valve 49.

The lengths of the stem 48 and socket therefor are such that, when the former is sheathed to its maximum extent in the socket, the valves will be spaced apart so as to obviate both valves being simultaneously upon their respective seats.

In operation of the invention on the windshield of an automobile which is driven by an internal combustion engine, the tube 31 is connected with the intake manifold, not shown, in which a partial vacuum obtains during the running of the engine.

Such vacuum acts alternately at opposite sides of the piston 23 and cooperates with pressure from air admitted to the opposite sides of the piston through the pipe 25 from the external atmosphere and, subject to the action of the valves in the piston, serves to effect the reciprocation of the cylinder 19 and the cleaning devices 12 which are connected thereto.

Figure 4:
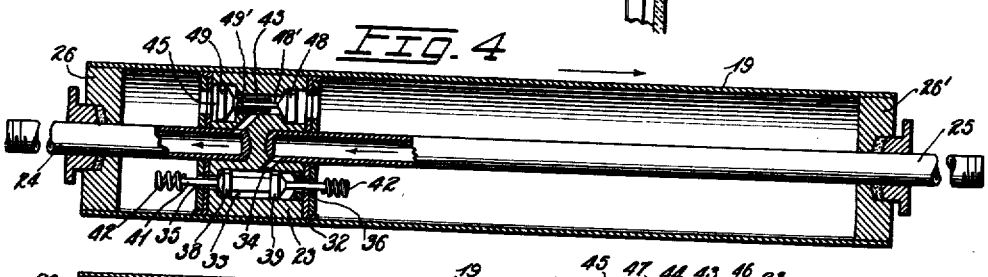
Figures 4 and 5 are longitudinal sectional views of the motor to an enlarged scale and illustrating the members thereof in different relative positions.
Figure 5:
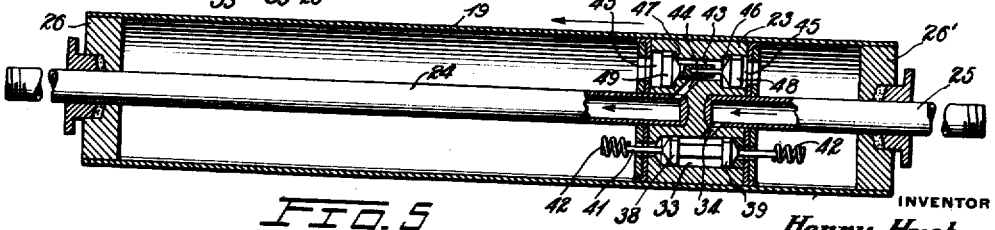

Assuming the valves 38—39 and 48—49 occupy the positions relative to their seats in which they are represented in Figure 4, then air at atmospheric pressure is admitted through pipe 25 and port 36 into the right hand space of the cylinder and at the same time air is exhausted from the left hand space through opening 45 and pipe 24 thereby effecting the movement of cylinder 19 toward the right. Such travel of the cylinder continues until the buffer spring 42 at the left hand side of the piston is engaged by the adjacent head 26 of the cylinder thereby shifting the valve 38—39 from the positions in which it is illustrated in Figure 4 into its Figure 5 position to accordingly supply air into the left hand cylinder-space, whereupon the air pressure acts against valve 49 to coincidently close the same against its seat and opening the other valve 48 as shown in Figure 5. The power due to vacuum and air pressure respectively at opposite sides of the piston then serves to move the cylinder toward the left until the cylinder head 26¹ encounters the adjacent one of the buffer springs 42 with a consequent shifting of the valves into their Figure 4 positions which effects a reversal in the travel of the cylinder and the associated cleaning devices. The springs 42 are adapted to be engaged by the adjacent ends of the cylinder as such ends near the limits of their stroke in one direction. Continued movement of the cylinder after such engagement compresses the spring 42 which is contacting with the cylinder and building up and storing spring potential energy or force therein until the potential force of the compressed spring is sufficient to overcome the tendency of the valves to remain in their then positions or on their seats, whereupon the force transmitted by the spring shifts the valves to their next position, that is, removing the one air admission valve which was on its seat from its seat and seating the other air admission valve. The buffer springs 42 afford movement to the cylinder subsequent to the shifting of the valve 38—39 which controls the air inlet to enable the valves 48 and 49 to be shifted before the end of each of the cylinder strokes. By adjusting the valve 30 the operator may regulate the speed of the cylinder, or stop it by controlling the exhaust. In other applications as in railway cars where compressed air is available the valve body 29 may be employed upon the outer end of the supply pipe 25 and the tube 31 connected with the source or reservoir of compressed air and the exhaust pipe 24 would then be open at its outer end to the atmosphere.

Various of the details of construction may be varied without departing from the spirit of the invention, and I therefore do not desire to be limited as to these or in any other details, except as set forth in the claims.

What I claim is:—

1. In an apparatus for cleaning windshields, a stationary support, means to secure said support to the inner side of the top rail of a windshield frame, a member mounted to reciprocate upon said support, a rod rotatably carried by said reciprocating member and extending parallel with the axis of reciprocation thereof, an arm pivoted on said rod and extending forwardly over the top rail of the windshield frame and then downwardly in front of the glass of said windshield, a cleaning element fixed to the lower end of said arm in position to engage the outer face of said windshield glass, a second arm fixed to said rod and extending downwardly adjacent the opposite face of said glass, an anti-friction member upon the lower end of the last named arm engaging the last named face of the windshield glass, and a coil spring engaging the rod and the first named arm for yieldingly urging the cleaning element and the anti-friction member into engagement with the respective faces of the windshield glass.

2. In a window cleaning device, a support, means to detachably secure the ends of the support to the frame of a window with the support extending parallel to one bar of the window frame, a member reciprocable upon said support and having bearing posts fixed upon the ends thereof, a rod parallel with said reciprocable member and rotatably mounted in the bearing posts, an arm pivotally mounted adjacent each bearing post upon said rod for swinging transversely of the reciprocable member, said arms extending forwardly and downwardly and having cleaning elements upon their lower ends, a third arm fixed to the central portion of the rod and having an anti-friction member upon its lower end, and springs associated with said rod and with each of the first named arms for urging the arms toward each other whereby clamping engagement of the anti-friction member and cleaning elements with the window glass is had.

3. In a window cleaning device, a support, means to secure the ends of the support to the frame of a window with the support extending parallel to one bar of the window frame, a relatively long cylinder reciprocable upon said support, an arm pivotally mounted adjacent each end of the cylinder for swinging transversely of the cylinder, said arms extending forwardly and downwardly and having cleaning elements upon their lower ends, a third arm mounted substantially midway between the first named arms and having an anti-friction member upon its lower end, and spring means associated with said arms for urging the arms toward each other whereby clamping engagement of the anti-friction member and the cleaning elements with the window glass is had.

4. In a window cleaning device, a support, means to secure the ends of the support to the frame of a window with the support extending parallel to one bar of the window frame, a cylinder reciprocable upon said support, an arm pivotally mounted on the cylinder for swinging transversely of the cylinder, said arm extending downwardly at the outer side of the window pane and having a cleaning element upon its lower end, a second arm mounted on the cylinder and having an anti-friction member upon its lower end, and spring means associated with said arms for urging the arms toward each other whereby clamping engagement of the anti-friction member and the cleaning element with the window glass is had.

5. In a window cleaning device, a stationary support including a piston with opposite axially arranged guide rods, means to secure the support to the frame of a window with the support extending parallel to one bar of the window frame, a cylinder mounted for reciprocation on said guide rods, an arm carried by and fixed at an angle to the longitudinal axis of said cylinder, said arm being shaped to extend downwardly at the outer side of the window pane, and a pane cleaning element upon the lower end of said arm yieldingly urged rearwardly toward the same.

6. An apparatus for cleaning windshields of automobiles propelled by internal combustion engines comprising in combination a motor having a relatively movable cylinder and piston adapted to be mounted as an entirety on the frame of an automobile windshield to be served, with suction connections leading from the intake of the automobile engine to the fixed element of said motor; valve means for admitting suction through said fixed element to the cylinder alternately at opposite sides of the piston; means actuated by the movable element of said motor for shifting said valve means for such alternation, and a wiper arm carried by said movable element.

7. An automobile windshield cleaner for automobiles propelled by internal combustion engines comprising in combination a cylinder and piston of which one of said elements is fixed and the other movable relatively thereto; means for mounting said device as an entirety by means of the fixed element thereof upon the frame of the windshield to be served thereby, said fixed element being adapted for pipe connections leading from the intake of the automobile engine and having ports for admitting to the cylinder, suction and atmospheric pressure respectively at the opposite sides of the piston; valve means controlling said ports; valve actuating means operated by the movable element to exclude suction from and admit atmospheric pressure to one side of the piston, and admit suction to and exclude atmospheric pressure from the other side, upon the stroke of said movable element in one direction, and reverse said valve means upon the stroke in opposite direction, and a wiper arm actuated by the movable element.

8. A fluid pressure operated windshield cleaner comprising a cylinder, a pair of pipes projecting one through one end of said cylinder and the other through the other end of said cylinder and slidably supporting the same, a piston arranged within the cylinder and joining the pipes, valved ports in the piston for alternately connecting the pipes to the ends of the cylinder on opposite sides of the piston for respectively admitting operating pressure to and exhausting resisting pressure from the cylinder, a wiper adapted to contact with the windshield glass and be moved thereon to clean the same by and during movement of the cylinder, and means for holding the cylinder against turning on the pipes and for supporting the wiper operative against the glass of the windshield being cleaned.

9. In a fluid operated automatic windshield cleaner adapted to be mounted on an automobile adjacent the windshield thereof and adapted to operate on low vacuum induced atmospheric air pressure as obtained by connecting the motor of the windshield cleaner with a suction passage from the automobile engine, a casing member, a piston member in said casing, one of said members being movable relatively to the other, a cleaner element for the windshield glass operably connected with the movable member, a suction or air exhaust port communicating with said casing, an air inlet port to said casing, means for connecting the suction or air exhaust port to said suction passage, and valve mechanism cooperating with the aforesaid openings adapted to connect alternately said exhaust port with the casing at opposite sides of the piston member and operated by one of the aforesaid members for subjecting the movable member to the impelling influence of air, first in one direction and then in an opposite direction to move said cleaner element on the windshield glass.

10. In a fluid operated automatic windshield cleaner adapted to be mounted on an automobile adjacent the windshield thereof and adapted to operate on low vacuum induced atmospheric air pressure as obtained by connecting the motor of the windshield cleaner with a suction passage from the automobile engine, a casing member, a piston member in said casing, one of said members being movable relatively to the other, a cleaner element for the windshield glass operably connected with the movable member, a suction or air exhaust port communicating with said casing, means adapted to connect the suction or air exhaust port to said suction passage, air inlet ports to said casing at opposite sides of said piston, a valve and valve mechanism operated by one of the aforesaid members for controlling the inlet of air to said casing first to one side and then at the opposite side of said piston including spring means adapted to be stressed as the movable member nears the limits of its stroke in each direction, whereby when sufficient spring potential is built up by stressing of the spring means to overcome the tendency of the valve to remain in its then position the valve is then moved to its other position to reverse the direction of movement of the movable member.

11. In an automatic windshield cleaner, a fluid pressure cylinder and piston, one of which parts is reciprocable relatively to the other in a plane substantially parallel to the surface of the windshield to be cleaned, means for mounting said cylinder on the upper horizontal frame bar of the windshield so that said cylinder is positioned lengthwise of and substantially parallel to said bar, a wiper member actuated from the reciprocable part of said cleaner and movable in a plane substantially parallel to the surface of the windshield to be cleaned, there being a conduit adapted to connect said fluid pressure cylinder to a suction passage between the vehicle engine and its fuel supply and means for admitting atmospheric air to said cylinder, and means actuated by said reciprocable member for automatically placing one end of said cylinder in communication with said suction conduit and the opposite end in communication with the atmosphere to cause said reciprocable member to move in one direction and at the end of that stroke automatically reversing the suction and atmospheric connections to cause the reciprocable member to move in the other direction.

12. In an automatic windshield cleaner, a fluid pressure cylinder and piston, one of which parts is reciprocable relatively to the other, means for mounting said cylinder at the inner side of the windshield frame of a vehicle, whereby said cylinder and piston are within the vehicle behind the windshield, a wiper adapted to contact with and be moved on the outer surface of the windshield to be cleaned, and means extending across the windshield from the inside thereof to the outside and connecting said reciprocable part to said wiper, there being means for supplying fluid pressure to said cylinder and for automatically reversing the direction of movement of said reciprocable part at the end of each stroke thereof.

13. In an automatic windshield cleaner, the combination of a fluid pressure cylinder and piston, one of which parts is reciprocable relatively to the other in a plane substantially parallel to the surface to be cleaned, means for mounting said cylinder on the frame of a vehicle windshield, so that the long dimension of said cylinder extends lengthwise of and substantially parallel to one of the horizontal frame bars of said windshield, there being means for supplying actuating fluid to said cylinder, means actuated by one of said parts for controlling the supply of actuating fluid to said cylinder and for automatically reversing the movement of said reciprocable part at the end of each stroke thereof, and a plurality of spaced wiper members adapted to contact with the surface of the windshield to be cleaned and connected with said reciprocable part to be moved thereby across the surface of the windshield when said reciprocable part is moved.

14. A windshield cleaner comprising a tube, a piston arranged therein, a cleaner element operably connected with one of the aforesaid members, means connecting said tube with a source of suction, and valve mechanism arranged in said tube near said connecting means, said valve mechanism being adapted to alternately establish communication between said connecting means and opposite ends of said tube.

15. A windshield cleaner for a motor vehicle having an internal combustion engine as its propelling means, said cleaner comprising a tube, a piston arranged therein, one of said members being movable relatively to the other, a cleaner element operably connected with the movable member, an imperforate conduit connecting said tube to the intake manifold of the engine whereby all air delivered to said intake manifold through said conduit is drawn through said tube to effect the operation of the movable member, and valve mechanism arranged in said tube near said conduit, said valve mechanism being adapted to alternately establish communication between said conduit and opposite ends of said tube.

16. A windshield cleaner for a vehicle having an internal combustion engine as its propelling means, said cleaner comprising a suction motor casing member adapted to be arranged adjacent the windshield of the vehicle, said casing having a suction opening and an air inlet opening communicating with the atmosphere, a member arranged in said casing, one of said members being movable relatively to the other, automatic means actuated by the movement of the movable member for alternately placing each end of said casing in communication with the suction opening and the opposite end in communication with the air inlet opening, a cleaner element operably connected with said movable member, said cleaner element being adapted to contact with and traverse a portion of the surface of the windshield to be cleaned, and an imperforate conduit connecting said suction opening to the intake manifold of the engine whereby air is drawn through said casing to operate said movable member and then delivered to the engine without interfering with the normal operation of the engine.

In testimony whereof, I have hereunto set my hand at Seattle, Washington, this 24 day of August, 1923.

HENRY HUEBER.

Certificate of Correction.

It is hereby certified that in Reissue Letters Patent No. 16,322, granted April 13, 1926, upon the application of Henry Hueber, of Seattle, Washington, for an improvement in "Power-Operated Windshield Cleaners," errors appear in the printed specification requiring correction as follows: Page 1, line 62, for the word "bottom" read *motor*, and line 101, for the word "cap" read *cup;* and that the said Letters Patent should be read with these corrections therein that the same may conform to the record of the case in the Patent Office.

Signed and sealed this 11th day of May, A. D. 1926.

[SEAL.]

M. J. MOORE,
*Acting Commissioner of Patents.*